United States Patent [19]
Komuro et al.

[11] Patent Number: 6,118,863
[45] Date of Patent: Sep. 12, 2000

[54] EXCHANGING APPARATUS AND CONTROL METHOD FOR EXCHANGING AND CONNECTING DESTINATION TERMINAL AND CALLING TERMINAL, AND COMMUNICATION TERMINAL APPARATUS COMMUNICATING WITH OTHER TERMINALS THROUGH COMMUNICATION NETWORK AND CONTROL METHOD

[75] Inventors: Isaku Komuro, Tokyo; Takashi Aoki, Tokorozawa, both of Japan

[73] Assignee: Kabushiki Kaisha Toshiba, Kawasaki, Japan

[21] Appl. No.: 08/931,940

[22] Filed: Sep. 17, 1997

[30] Foreign Application Priority Data

Sep. 20, 1996 [JP] Japan ................................. 8-250160

[51] Int. Cl.[7] .................................................. H04M 3/42
[52] U.S. Cl. ........................................ 379/209; 379/265
[58] Field of Search ................... 379/209, 210, 379/211, 215, 265, 266, 309

[56] References Cited

U.S. PATENT DOCUMENTS

| | | | |
|---|---|---|---|
| 5,185,782 | 2/1993 | Srinivasan | 379/266 |
| 5,278,898 | 1/1994 | Cambray et al. | 379/265 |
| 5,311,574 | 5/1994 | Livanos | 379/209 |
| 5,600,710 | 2/1997 | Weisser, Jr. et al. | 379/265 |
| 5,692,033 | 11/1997 | Farris | 379/265 |
| 5,778,060 | 7/1998 | Otto | 379/207 |

*Primary Examiner*—Scott Wolinsky
*Assistant Examiner*—Benny Q. Tieu
*Attorney, Agent, or Firm*—Finnegan, Henderson, Farabow, Garrett & Dunner, L.L.P.

[57] ABSTRACT

A CPU calls in accordance with a MW call-back request one of MW call-back candidates registered in a MW call-back candidate memory region to correspond to a called extension terminal issuing a MW call-back request. When a plurality of MW call-back candidates are registered to correspond to the called terminal, one of the MW call-back candidate terminals which corresponds to one of the count values stored in the count value memory region, which corresponds to the requesting terminal issuing the MW call-back request, is determined as destination terminal. When no response to the MW call-back is obtained, the CPU changes the destination terminal to be called back the next by the same requesting terminal by changing the count values of the MW call-back candidates, which are provided to correspond to the requesting terminal.

24 Claims, 11 Drawing Sheets

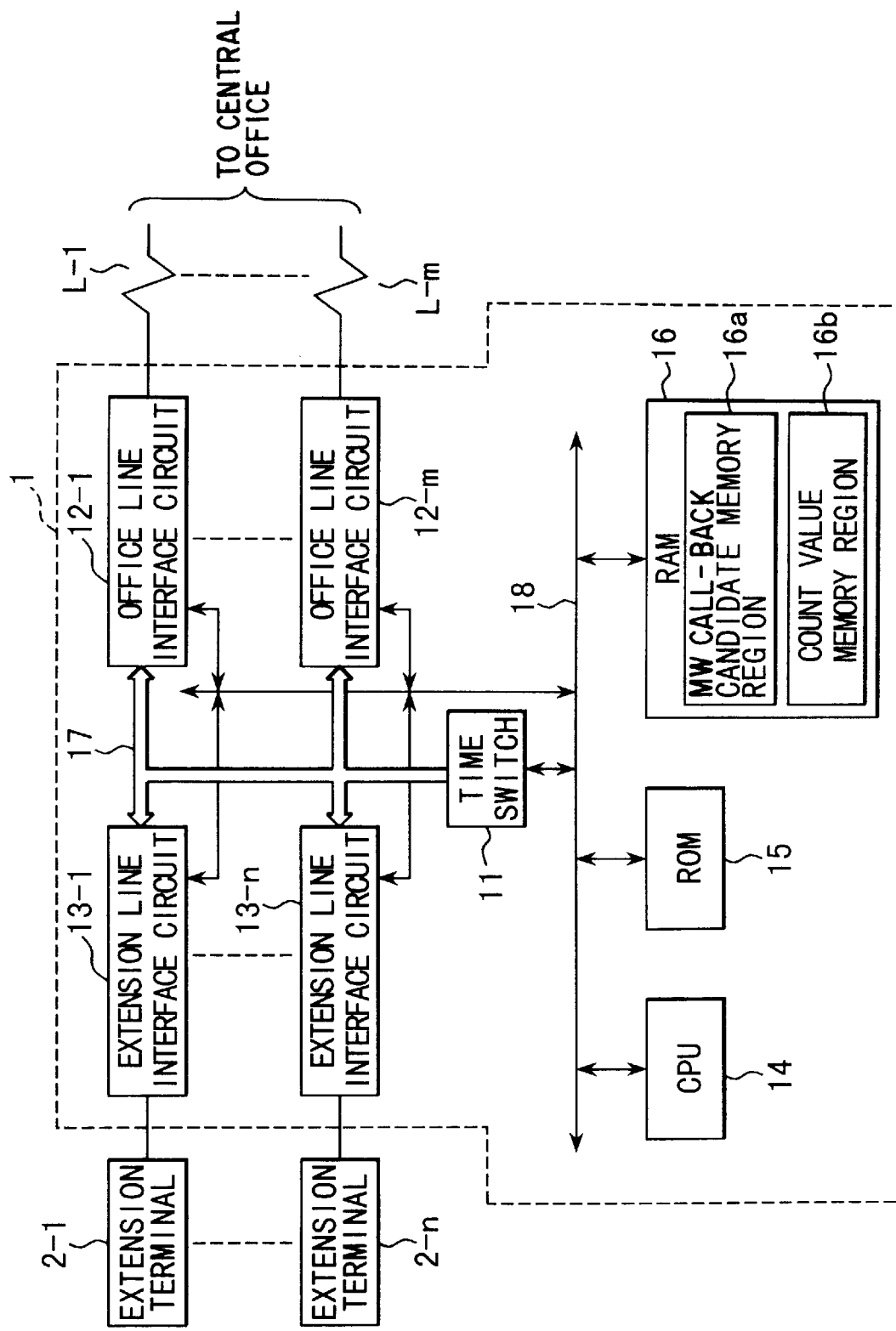
F I G. 1

|  | 1ST AREA | 2ND AREA | 3RD AREA | 4TH AREA |
|---|---|---|---|---|
| PORT 00 | 01 | 04 | 03 | 02 |
| PORT 01 | FF | FF | FF | FF |
| PORT 02 | FF | FF | FF | FF |
| PORT 03 | FF | FF | FF | FF |
| PORT 04 | FF | FF | FF | FF |

FIG. 2

|  | COUNTER |
|---|---|
| PORT 00 | 00 |
| PORT 01 | 00 |
| PORT 02 | 00 |
| PORT 03 | 00 |
| PORT 04 | 00 |

FIG. 3

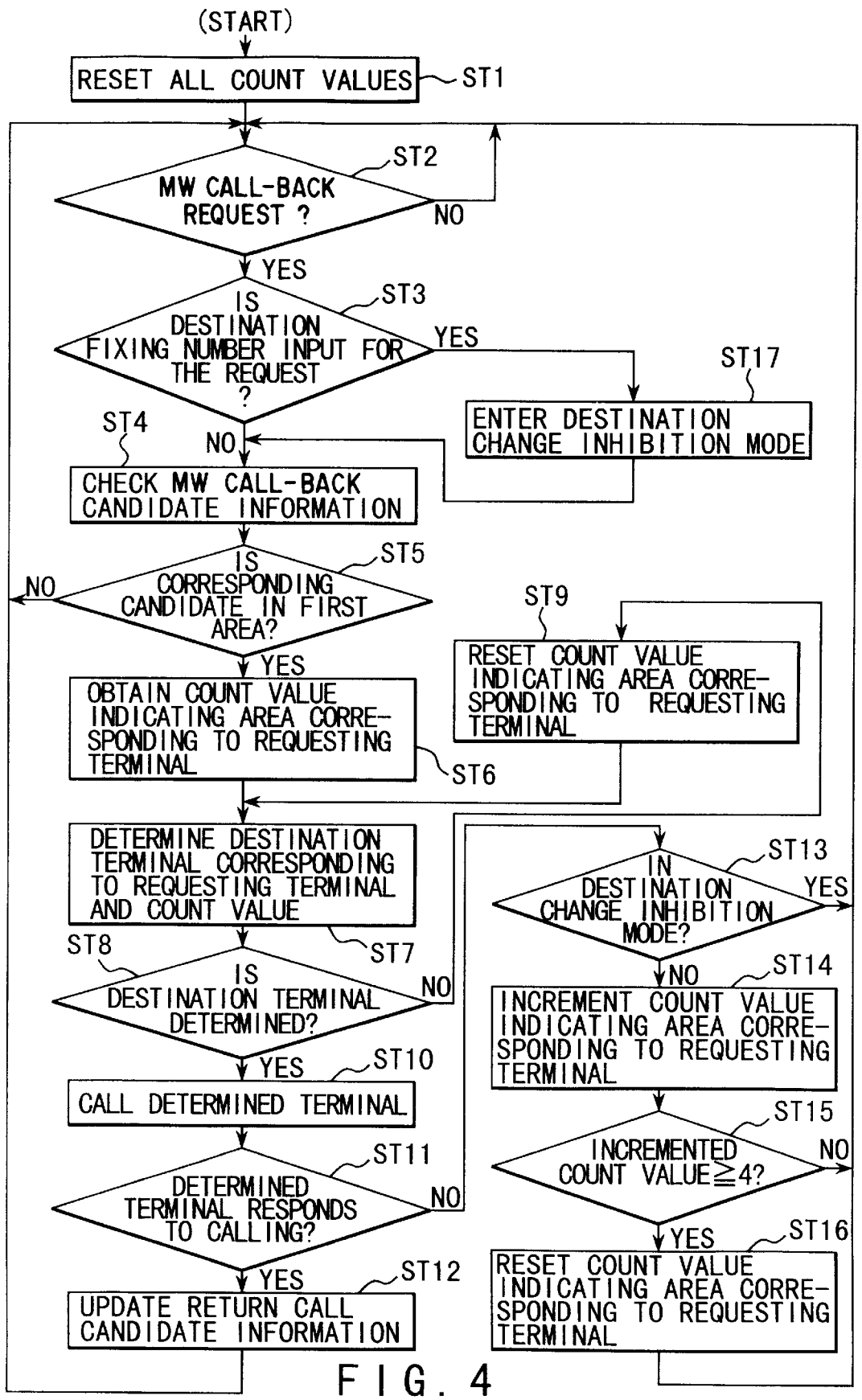
F I G. 4

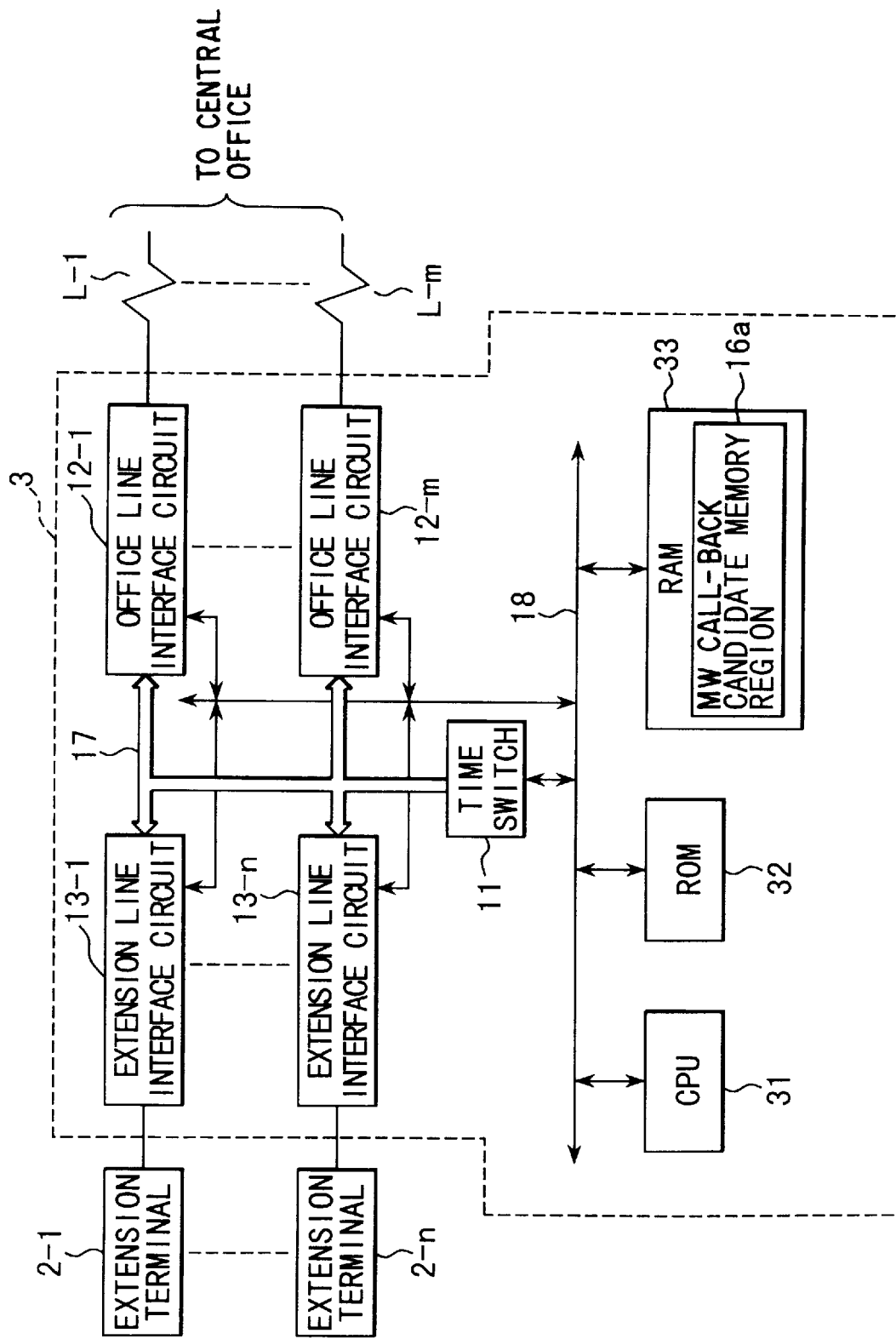
F I G. 5

|  | 1ST AREA | 2ND AREA | 3RD AREA | 4TH AREA |
|---|---|---|---|---|
| PORT 00 | 01 | 04 | 03 | 02 |
| PORT 01 | FF | FF | FF | FF |
| PORT 02 | FF | FF | FF | FF |
| PORT 03 | FF | FF | FF | FF |
| PORT 04 | FF | FF | FF | FF |

FIG. 7A

|  | 1ST AREA | 2ND AREA | 3RD AREA | 4TH AREA |
|---|---|---|---|---|
| PORT 00 | 04 | 03 | 02 | 01 |
| PORT 01 | FF | FF | FF | FF |
| PORT 02 | FF | FF | FF | FF |
| PORT 03 | FF | FF | FF | FF |
| PORT 04 | FF | FF | FF | FF |

| 101 | 104 | 103 | 102 |
|---|---|---|---|

FIG. 8B

| 104 | 103 | 102 | 101 |
|---|---|---|---|

FIG. 10

| 1ST AREA | 0101234567 |
|---|---|
| 2ND AREA | 0809988888 |
| 3RD AREA | 0301010101 |
| 4TH AREA | 0301386420 |

FIG. 14A

| 1ST AREA | 0101234567 |
|---|---|
| 2ND AREA | 0809988888 |
| 3RD AREA | 0301010101 |
| 4TH AREA | 0301386420 |

FIG. 14B

| 1ST AREA | 0809988888 |
|---|---|
| 2ND AREA | 0301010101 |
| 3RD AREA | 0301386420 |
| 4TH AREA | 0101234567 |

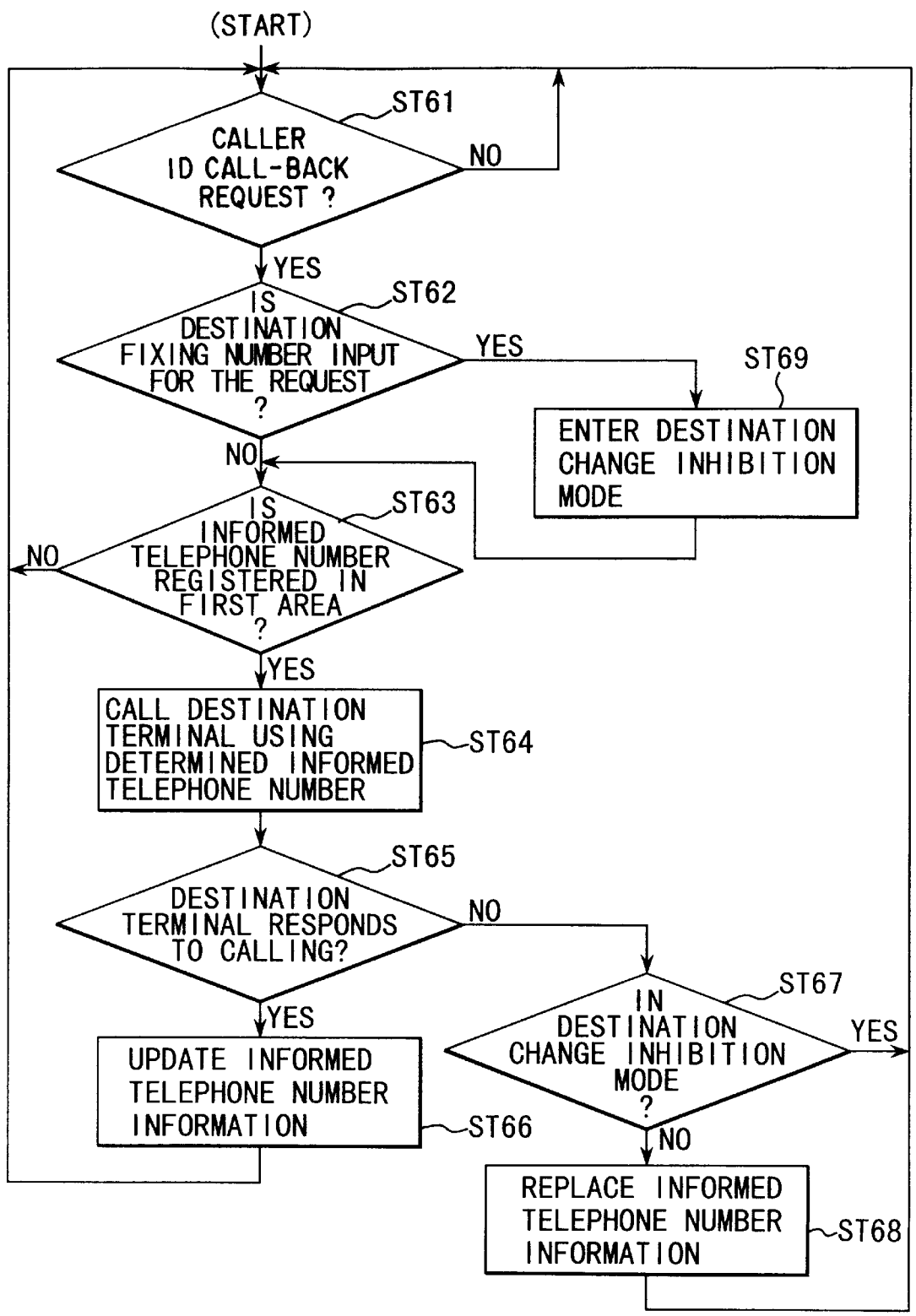
F I G. 13

EXCHANGING APPARATUS AND CONTROL METHOD FOR EXCHANGING AND CONNECTING DESTINATION TERMINAL AND CALLING TERMINAL, AND COMMUNICATION TERMINAL APPARATUS COMMUNICATING WITH OTHER TERMINALS THROUGH COMMUNICATION NETWORK AND CONTROL METHOD

BACKGROUND OF THE INVENTION

This invention relates to an exchanging apparatus having message-waiting function, such as a key telephone system, and the control method of controlling the exchange, and a communication terminal apparatus having caller ID call-back function, such as a cellular communication terminal, and the control method.

The message-waiting function is equipped to an exchanging apparatus such as a key telephone system. According to the message-waiting function, a calling terminal which calls a destination terminal is registered as a candidate terminal to be called in accordance with an instruction when the destination terminal does not respond to the call. When an arbitrary terminal makes a massage-waiting call-back (MW call-back) request to return the calling to the calling terminal, the candidate terminal which called to the requesting terminal and registered to correspond to the requesting terminal is automatically called.

The conventional exchanging apparatus equipped with the message-waiting function is provided with a memory region capable of storing a plurality (four, for example) of extension terminals for each of extension terminals provided to the apparatus. The plurality of registered extension terminals each has called the corresponding extension terminal. When the called extension terminals makes a MW call-back request, the registered extension terminals are called in order of the registration.

The caller ID call-back function is equipped to a communication terminal apparatus such as a cellular communication terminal. According to the caller ID call-back function, when a communication terminal cannot respond to the calling, telephone numbers of calling terminals are informed from the network and stored. When the user of the called terminal issues a caller ID call-back request, the terminal automatically calls back to the calling terminal with use of the stored telephone number.

The conventional communication terminals equipped with the caller ID call-back function has a memory region for storing a plurality of telephone numbers informed from the network. When the caller ID call-back request occurs under the condition where a plurality of telephone numbers are stored in the memory region, the oldest one of the telephone numbers are used for the calling-back.

As should be clear from the above, according to the conventional exchanging apparatus and communication terminal apparatus, the user cannot call any registered terminals till the oldest one of the registered terminals responds to the call.

In view of this problem, there is developed an apparatus provided with the function for canceling the registration of the terminal registered at first, in response to the special cancel instruction. By using such a function, when the terminal registered first does not respond to the calling, the user can cancel the registration and call the other terminal registered in the memory.

If the above-mentioned canceling is executed, however, the registration of the first-registered terminal which does not respond to the calling but has not been connected with the user yet is canceled, and the user cannot execute the message-waiting response or the calling-back to the terminal the registration of which is canceled. Further, the user must issue a special instruction to cancel the registration, and the canceling operation is rather complicated. When the user does not remember the canceling operation, the user cannot cancel the registration.

BRIEF SUMMARY OF THE INVENTION

The present invention is presented in view of the above-mentioned problems, and intends to provide an exchanging apparatus and the communication terminal apparatus enabling the user to automatically call a registered terminal even if the other terminals registered prior to the terminal cannot response to the user's calling in that time, without increasing the burden of the user in operation.

The above-mentioned object of the present invention is attained by the exchanging apparatus comprising registering means for registering for each terminal a calling terminal as a message-waiting call-back candidate terminal to be called by a called terminal when the called terminal does not respond to the calling from the calling terminal, the number of the calling terminals which can be registered for one called terminal being two or more; message-waiting call-back means for, in response to a message-waiting call-back request from an arbitrary one of terminals connected to the exchanging apparatus, calling a predetermined one of the message-waiting call-back candidate terminals which are registered for the requesting terminal; and update means for, when the predetermined one of the message-waiting call-back candidate terminals receiving the message-waiting call-back does not respond thereto, updating information of the predetermined one of the message-waiting call-back candidate terminals by replacing it with that of the other one of the message-waiting call-back candidate terminals to be called in response to a next message-waiting call-back request when the other one of the message-waiting call-back candidate terminals is registered in the registering means.

The above-mentioned object of the present invention is also attained by the exchanging apparatus comprising registering means for registering for each terminal a predetermined number of calling terminals as a message-waiting call-back candidate terminal to be called by a called terminal when the called terminal does not respond to the calling from the calling terminal, the number of the calling terminals which can be registered for one called terminal is two or more; count means provided to each of terminals which can be the called terminal, capable of cyclically counting the predetermined number; message-waiting call-back means for, in response to a message-waiting call-back request from an arbitrary one of terminals connected to the exchanging apparatus, calling a predetermined one of the message-waiting call-back candidate terminals, which corresponds to a count value of one of the count means provided to the requesting terminal; and count control means for, when the one of the message-waiting call-back candidate terminals receiving the message-waiting call-back does not respond thereto, changing the count value of the one of the counting means which is provided to the requesting terminal.

The above-mentioned object of the present invention is attained also by the exchanging apparatus comprising storing means for storing identification information of calling terminals so as to correspond to the destination terminal respectively when the destination terminal does not respond to the calling from the calling terminal, each of the calling terminal being provided with a plurality of memory regions a priority of each of the memory regions being determined in advance; message-waiting call-back means for calling the terminal corresponding to the identification information stored in one of the memory regions which has the highest priority, as a message-waiting call-back destination terminal to be called in response to a message-waiting call-back request from an arbitrary one of terminals connected to the exchanging apparatus; and priority update means for, when a response to the massage-waiting call-back is not obtained, moving the identification information stored in the memory region having the highest priority to a memory region having the lowest priority, and moving the other identification information each stored in the other memory regions to the memory regions each having a priority one higher than that of the memory regions in which each of the identification information is stored at first.

The above-mentioned object of the present invention is further attained by the communication terminal apparatus comprising storing means for storing a plurality of calling information sent from a communication network when a terminal is called; caller ID call-back means for, in response to a predetermined caller ID call-back request, calling a terminal with use of a predetermined one of the calling information stored in the storing means; and update means for, when the calling by the caller ID call-back means does not obtain a response, updating the calling information by replacing it with different calling information to be used in response to a next message-waiting call-back request when the other calling information is stored in the storing means.

The above-mentioned object of the present invention is also attained by the communication terminal apparatus comprising storing means for storing a predetermined number of calling information sent from a communication network when a terminal is called; count means capable of cyclically counting the number of the calling information; caller ID call-back means for, in response to a predetermined caller ID call-back request, calling a terminal with use of one of the calling information stored in the storing means, which corresponds to a count value of the counting means; and count control means for, when the calling by the call back means does not obtained response, changing the count value of the counting means.

The above-mentioned object of the present invention is attained also by the communication terminal apparatus comprising storing means for storing calling information sent from a communication network when a terminal is called, the storing means having a plurality of memory regions, a priority order of each of the memory regions being determined in advance; caller ID call-back means for, in response to a predetermined caller ID call-back request, calling a terminal with use of the identification information stored in a memory region with the highest priority; and priority update means for, when the calling by the caller ID call-back means does not obtained a response, moving the identification information stored in the memory region with the highest priority to a memory region having the lowest priority, and moving the other identification information stored in the other memory regions to the memory regions each having a priority one higher than that of the memory regions in which each of the identification information is stored at first.

The object of the present invention is also attained by the exchanging control method comprising a registering step of registering for each terminal a calling terminal as a message-waiting call-back candidate terminal to be called by a called terminal in registering means for registering the terminal when the called terminal does not respond to the calling from the calling terminal, the number of the calling terminals which the registering means can register for one called terminal being two or more; message-waiting call-back step of, in response to a message-waiting call-back request from an arbitrary one of terminals connected to the exchanging apparatus, calling a predetermined one of the message-waiting call-back candidate terminals which are registered for the requesting terminal; and update step for, when the predetermined one of the message-waiting call-back candidate terminals receiving the message-waiting call-back does not respond thereto, updating information of the predetermined one of the message-waiting call-back candidate terminals by replacing it with that of the other one of the message-waiting call-back candidate terminals to be called in response to a next message-waiting call-back request when the other one of the message-waiting call-back candidate terminals is registered in the registering means.

The above-mentioned object of the present invention is also attained by the exchanging control method comprising a registering step of registering for each terminal a calling terminal as a message-waiting call-back candidate terminal to be called by a called terminal in registering means for registering the terminal when the called terminal does not respond to the calling from the calling terminal, the number of the calling terminals which the registering means can register for one called terminal being two or more; message-waiting call-back step of, in response to a message-waiting call-back request from an arbitrary one of terminals connected to the exchanging apparatus, calling a predetermined one of the message-waiting call-back candidate terminals, which corresponds to a count value of one of the count means provided to the requesting terminal, capable of cyclically counting the predetermined number; and count control step of, when the one of the message-waiting call-back candidate terminals receiving the message-waiting call-back does not respond thereto, changing the count value of the one of the counting means which is provided to the requesting terminal.

The above-mentioned object of the present invention is attained also by the exchanging control method comprising storing step of storing identification information of calling terminals in storing means, in which each of the calling terminal is provided with a plurality of memory regions a priority of each of the memory regions being determined in advance, so as to correspond to the destination terminals respectively when the destination terminal does not respond to the calling from the calling terminal, message-waiting call-back step of calling the terminal corresponding to the identification information stored in one of the memory regions which has the highest priority, as a message-waiting call-back destination terminal to be called in response to a message-waiting call-back request from an arbitrary one of terminals connected to the exchanging apparatus; and priority update step of, when a response to the message-waiting call-back is not obtained, moving the identification information stored in the memory region having the highest priority to a memory region having the lowest priority, and moving the other identification information each stored in the other memory regions to the memory regions each having a priority one higher than that of the memory regions in which each of the identification information is stored at first.

The above-mentioned object of the present invention is further attained by the communication terminal control method comprising storing step of storing in storing means a plurality of calling information sent from a communication network when a terminal is called; caller ID call-back step of, in response to a predetermined caller ID call-back request, calling a terminal with use of a predetermined one of the calling information stored in the storing step; and update step of, when the calling by the caller ID call-back means does not obtain a response, updating the calling information by replacing it with different calling information to be used in response to a next caller ID call-back request when the other calling information is stored in the storing step.

The above-mentioned object of the present invention is also attained by the communication terminal control method comprising storing step of storing in storing means for storing a predetermined number of calling information sent from a communication network when a terminal is called; caller ID call-back step of, in response to a predetermined caller ID call-back request, calling a terminal with use of one of the calling information stored in the storing means, which corresponds to a count value of count means capable of cyclically counting the number of the calling information; and count control step of, when the calling by the call back means does not obtained response, changing the count value of the counting means.

The above-mentioned object of the present invention is attained also by the communication terminal control method comprising storing step of storing in storing means for storing calling information sent from a communication network when a terminal is called, the storing means having a plurality of memory regions, a priority order of each of the memory regions being determined in advance; caller ID call-back step, in response to a predetermined caller ID call-back request, calling a terminal with use of the identification information stored in a memory region with the highest priority; and priority update step of, when the calling by the caller ID call-back means does not obtained a response, moving the identification information stored in the memory region with the highest priority to a memory region having the lowest priority, and moving the other identification information stored in the other memory regions to the memory regions each having a priority one higher than that of the memory regions in which each of the identification information is stored at first.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, servo to explain the principles of the invention;

FIG. 1 is a block diagram showing the main portion of a key telephone system having a structure including the exchanging apparatus according to the first embodiment of the present invention;

FIG. 2 is a memory map schematically showing each area of a MW call-back candidates memory region;

FIG. 3 is a memory map schematically showing each area of a count value memory region;

FIG. 4 is a flow chart representing the MW call-back processing by a CPU in reply to a message waiting request;

FIG. 5 is a block diagram showing the main portion of a key telephone system having a structure including the exchanging apparatus according to the second embodiment of the present invention;

FIGS. 7A and 7B are memory maps schematically showing the contents of the MW call-back candidate memory region before and after updating the MW call-back candidate information;

FIGS. 8A and 8B are memory maps schematically showing the one example of a display of the extension terminals before and after updating the MW call-back candidate information;

FIG. 10 is a memory map schematically showing the contents of informed number memory region;

FIG. 13 is a flow chart representing the caller ID call-back processing by a CPU in reply to a caller ID call-back request; and FIGS. 14A and 14B are memory maps schematically showing the contents of the informed number memory region before and after updating the informed telephone numbers.

DETAILED DESCRIPTION OF THE INVENTION

Figure 6:
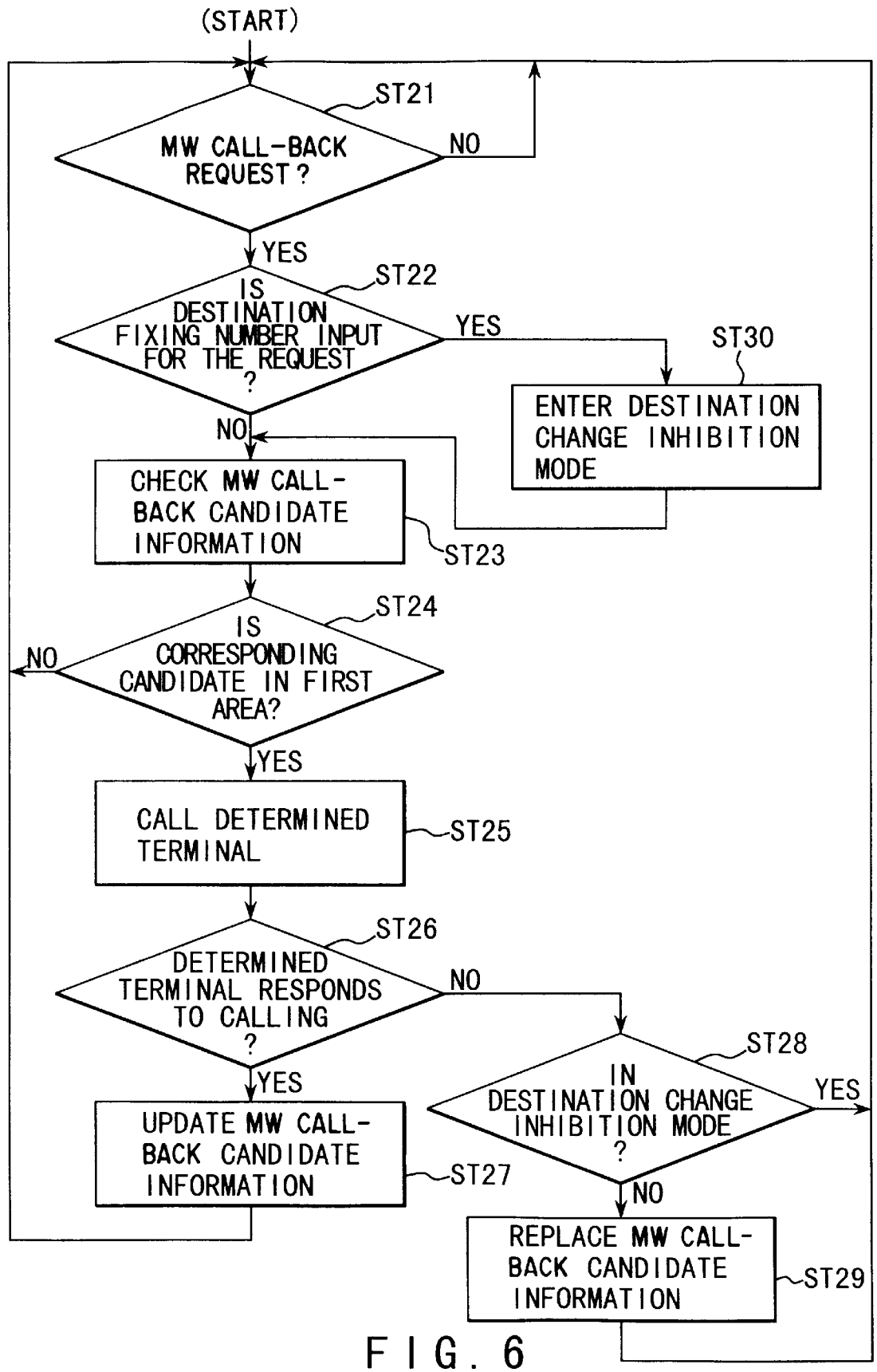
FIG. 6 is a flow chart representing the MW call-back processing by a CPU in reply to a message waiting request.

This invention can be more fully understood from the following detailed description when taken in conjunction with the accompanying drawings.

The First Embodiment

FIG. 1 is a block diagram showing the main portion of a key telephone system having a structure including the exchanging apparatus according to the present embodiment. As shown in the drawing, the key telephone system according to the present embodiment comprises a key service unit 1 connected to a plurality (n, at most) of extension terminals 2 (2-1, . . . 2-n).

The key service unit 1 comprises a time switch 11, a plurality (m) of the office line interface circuits 12 (12-1, . . . 12-m), extension line interface circuits 13 (13-1, . . . 13-n), CPU 14, ROM 15, and RAM 16. The time switch 11, line interface circuits 12, and extension line interface circuits 13 are connected to each other through a PCM highway 17. The time switch 11, office line interface circuits 12, extension line interface circuits 13, CPU 14, ROM 15, and RAM 16 are connected to each other through a data highway 18.

The time switch 11 switches time slots on the PCM highway 17 in accordance with the control by the CPU 14, thereby arbitrarily connects the office line interface circuits 12 and the extension line interface circuits 13 to each other.

The office line interface circuits 12 are connected in necessity to lines L (L-1, . . . L-m) such as public lines and private lines. The office line interface circuits 12 execute line interface operations for the connected lines L, i.e., the conversion from an audio (i.e., analog) signal transmitted through the lines L into a PCM signal, the conversion from a PCM signal transmitted through the lines L time switch 11 into an audio signal, the monitoring of the lines L, and the transmission of various signals to the network connected to the exchanging apparatus through the lines L. The office line interface circuits 12 receive/transmit the controlling information related to the line interface from/to the CPU 14 via the data highway 18.

The extension line interface circuits 13 are connected to the extension terminals 2 (2-1, . . . 2-n), in necessity. The extension line interface circuits 13 execute interface operations related to the connected extension terminals, i.e., the transmission of the PCM signals output from the extension terminals 2 to the PCM highway 17, the extraction of the PCM signals transmitted from the PCM highway 17 via the time switch 11, the monitoring of the lines L, and the transmission of various signals to the extension terminals. The extension line interface circuits 13 receive/transmit the controlling information related to the extension line interface from/to the CPU 14 via the data highway 18.

The CPU 14 executes processings in accordance with the operating programs stored in the ROM 15 and controls the time switch 11, the office line interface circuits 12 and the extension line interface circuits 13 respectively, thereby operates the key service unit of the key telephone system.

The RAM 16 stores various information necessary for the processing of the CPU. A part of memory regions of the RAM 16 is provided as MW call-back candidate memory region 16a and count value memory region 16b.

The MW call-back candidate memory region 16a is provided for registering extension terminals 2, which set themselves in the message waiting state for waiting for the MW call-back from one of the extension terminals connected to the apparatus is registered for each of the extension terminals 2. In the MW call-back candidate memory region 16a, a plurality (four in this embodiment) of the extension terminals 2 can be registered for one extension terminal. The count value memory region 16b stores for each of the extension terminals count values indicating which of area in the MW call-back candidate memory region 16a the destination terminal to be called back is registered.

The CPU 14 executes processings in accordance with operating programs stored in the ROM 15, thereby attains not only the well-known general control function in the key service unit of the key telephone system, but also MW call-back processing function, count value updating function, and count value updating inhibition function, as described below.

According to the MW call-back processing function, when one of the extension terminals issues the MW call-back request, the destination extension terminal 2 which has issued the message waiting instruction and for which a MW call-back is to be made is determined on the basis of the information stored in the MW call-back candidate memory region 16a and the count value memory region 16b, and then the determined destination extension terminal is called. The count value updating function is provided for incrementing each of the count values stored in the count value memory region 16b by one when the response to the calling made by the MW call-back processing function is not obtained. The count value updating inhibition function is provided for inhibiting the increment of the count values by the count value updating function.

In this embodiment, the extension terminals 2 are respectively managed using the numbers denoted to ports (not shown) to which the respective extension terminals are connected. The MW call-back candidate memory region 16a and the count value memory region 16b store information concerning the terminal to be called back, in such a manner as shown in FIGS. 2 and 3, respectively.

FIG. 2 shows that the MW call-back candidate memory region 16a stores the information of the extension terminals 2 connected to ports "01", "04", "03", and "02", each registered as MW call-back candidates to receive the MW call-back from the extension terminal 2 connected to a port "00". The character "FF" indicates that no extension terminals to receive the MW call-back from the extension terminal "00" is registered.

The key telephone system has the key service unit constituted as mentioned above. The operation of the key telephone system will be described below in order of processing steps of the CPU. The exchange service and the registration of the extension terminals which issued the message waiting instruction are executed in the same manner as that of the conventional key telephone system, and the description thereof is omitted. In this description, the processing relating to the MW call-back to the extension terminal set in the message waiting state will be mainly described.

The operation of the apparatus is started by turning the switch on or by resetting the system, and then the CPU 14 resets all the count values stored in the count value memory region 16b at "00" to initialize the count values (ST 1 in FIG. 4). After resetting the count values, the CPU waits for a MW call-back request, i.e., the instruction to send a MW call-back to one of the extension terminals which issued the message waiting instruction (ST 2), issued by the user at one of the extension terminals 2.

After a predetermined instruction is issued according to the MW call-back request, the CPU 14 determines whether or not the MW call-back request is issued by inputting a predetermined destination fixing number (ST 3).

When the MW call-back request is issued not by the input of the destination fixing number, but by executing a normal operation (e.g. the pushing of a MW call-back key), the CPU 14 checks areas in the MW call-back candidate memory region 16a, which is provided to the extension terminal 2 (hereinafter referred to as "requesting terminal") issuing the MW call-back request (ST 4). In this time, the CPU 14 determines whether or not the information is registered in the first area of the MW call-back candidate memory region 16a (ST 5). When no information is registered in the first area, no message waiting instruction is issued to the requesting terminal, and thus the CPU 14 returns to ST 2 to be set in a wait state for waiting for the MW call-back request.

When the calling candidate information is registered in the first area, the CPU 14 obtains from the count value memory region 16b (ST 6) the count value indicating which area in the MW call-back candidate memory region 16a stores the MW call-back candidate information corresponding to the requesting terminal, to identify the extension terminal 2 to be called (ST 7). In ST 7, the area storing the return call candidate information is determined by use of the obtained count value. Among the return call candidates in the determined area, one corresponding to the requesting terminal is determined as the extension terminal 2 to be called. At the starting time for example, all the count values in the count value memory region 16b are reset at "00" indicating the first area. The MW call-back candidate information is thus determined to be stored in the first area, and the extension terminal 2 to be called is determined in accordance with the MW call-back candidate information stored in the first area. In the case where the MW call-back candidate information is stored in the MW call-back candidate memory region 16a in such a manner as shown in FIG. 2 and the requesting terminal is connected to the port "00", the extension terminal 2 to be called is determined to be connected to the port "01".

When the number of the MW call-back candidate information registered for each of the extension terminals 2 are less than four, the number of areas storing the MW call-back candidate information is smaller than four. Therefore, when the number of the count values is larger than that of the areas storing the MW call-back candidate information and the area indicated by the largest code number stores no information, the extension terminal 2 to be called fails to be determined in ST 7. In consideration of the case where the determination fails, the CPU 14 checks whether or not the extension terminal 2 to be called is determined in ST 7 (ST 8). When the extension terminal 2 to be called is not determined in ST 7, the count value indicating the area storing the MW call-back candidate corresponding to the requesting terminal is reset to "00" in the count value memory region such that the count value indicates the first area (ST 9), and the CPU 14 returns to ST 7 to determine the extension terminal 2 to be called.

When the extension terminal 2 to be called is determined in ST 7, the CPU 14 controls the corresponding one of the extension line interface circuits 13 in order to call the determined extension terminal 2 determined to be called (ST 10), and determines whether or not the response to the calling is obtained from the called terminal (ST 11).

If it is determined in ST 11 that the response is obtained, the CPU 14 updates the MW call-back candidate information (ST 12). The updating is executed to eliminate the information of the extension terminal 2 called in this time from the registration of the MW call-back candidate memory region 16a since the message waiting operation has been completed. When the calling operation of the extension terminal 2 indicated by the MW call-back candidate information stored in the first area has been completed and the information stored in the first area is deleted, the MW call-back candidate information stored in the second area is moved to the first area, the MW call-back candidate information stored in the third area is moved to the second area, and the MW call-back candidate information stored in the fourth area is moved to the third area. After moving them, the fourth area is represented by the character "FF" indicating that no extension terminal is registered. In the other case where the calling operation of the extension terminal 2 indicated by the MW call-back candidate information stored in the third area has been completed and the information stored in the third area is deleted, the MW call-back candidate information stored in the fourth area is moved to the third area without moving the MW call-back candidate information stored in the first and second areas to anywhere. Then, the fourth area is represented by the character "FF" indicating that no extension terminal is registered.

When no response to the calling is obtained in ST 10, the CPU 14 determines whether or not the system is in the destination change inhibition mode (ST 13), and if the system is not in the destination change inhibition mode, increments the count value corresponding to the requiring terminal by one (ST 14). The CPU 14 then determines whether or not the incremented count value is not less than "04" (ST 15). If the count value exceeds "03" indicating the fourth area, the CPU sets the count value at "00" (ST 16). By resetting the count value in this manner, the terminal to be called next by the same requiring terminal 2 is changed.

When the count value is less than "04", or when the resetting of the count value has been completed, the CPU 14 returns to ST 2, i.e., is set in a waiting state.

As described above, the terminal to be called among a plurality of MW call-back candidates is determined by the count value, and when no response to the calling in accordance with the MW call-back request is obtained from the terminal, the count value of the MW call-back candidate is incremented to automatically change the terminal to be called next in reply to the MW call-back request by the same requiring terminal. In this manner, even if one of the MW call-back candidates cannot respond to the calling because the line is busy or the user is out, the user of the requesting extension terminal 2 for which the MW call-back candidates are registered can perform the MW call-back operation to the other MW call-back candidates merely by repeating the normal MW call-back request, with no special procedures.

In addition, according to the above-mentioned method of the present invention, the extension terminal 2 which could not respond to the calling from the requesting terminal is never eliminated from the registration, and the user at the requesting terminal can thus perform the MW call-back operation to the terminal merely by repeating the normal MW call-back request.

In the mean time, according to the present embodiment, when a terminal does not respond to the MW call-back, the terminal is automatically changed to the other terminal to be called next by the same requesting terminal if a plurality of MW call-back candidates are registered for the requesting terminal. Therefore, even if the user wishes to perform the MW call-back operation for a specific MW call-back candidate, when the specific MW call-back candidate does not response to the calling, the other MW call-back candidate will be automatically called in contrary to the user's intention.

In order to prevent such an undesired change of the destination terminal, the system of the present embodiment is provided with a destination fixing number, i.e., a number indicating the specific MW call-back candidate. When the MW call-back request is issued with a destination fixing number, the CPU 14 enters into the destination changing inhibition mode (ST 30). If the CPU 14 is in the destination changing inhibition mode when it is determined in ST 11 that the response to the calling performed in ST 10 has not been obtained, the CPU 14 returns to ST 2 without executing the increment of the count value in ST 14.

By setting the destination changing inhibition mode in this manner, the user can repeatedly perform the MW call-back operation to the specific MW call-back candidate, even if the specific terminal does not response to the MW call-back.

The Second Embodiment

The following is the description of the second embodiment of the present invention.

FIG. 5 is a block diagram showing the main portion of a key telephone system having a structure including the exchanging apparatus according to the present embodiment. The same portions as those shown in FIG. 1 are denoted as the same reference numerals for simplicity of illustration, and the detailed description is omitted. As shown in the drawing, the key telephone system according to the present embodiment comprises a key service unit 3 connected to a plurality (n, at most) of extension terminals 2 (2-1, . . . 2-n).

The key service unit 3 comprises a time switch 11, a plurality (m) of the office line interface circuits 12 (12-1, . . . 12-m), extension line interface circuits 13 (13-1, . . . 13-n), CPU 31, ROM 32, and RAM 33. The time switch 11, line interface circuits 12, and extension line interface circuits 13 are connected to each other through a PCM highway 17. The time switch 11, office line interface circuits 12, extension line interface circuits 13, CPU 31, ROM 32, and RAM 33 are connected to each other through a data highway 18.

As is clear from this constitution, the key service unit 3 in the present embodiment has the same structure as the key service unit 1 except for the CPU 31, ROM 32, and RAM 33 which are provided instead of the CPU 14, ROM 15, and RAM 16 of the first embodiment.

The CPU 31 executes processings in accordance with the operating programs stored in the ROM 32 and controls the time switch 11, the office line interface circuits 12 and the extension line interface circuits 13 respectively, thereby operates the key service unit of the key telephone system.

The RAM 33 stores various information necessary for the processing of the CPU. A part of memory regions of the RAM 33 is provided as a MW call-back candidate memory region 16*a*.

The CPU 31 executes processings in accordance with operating programs stored in the ROM 32, thereby attains not only the well-known general control function in the key service unit of the key telephone system, but also MW call-back processing function, destination change function, and destination change inhibition function, as described below.

According to the MW call-back processing function, when one of the extension terminals issues the MW call-back request, the destination extension terminal 2 which has issued the message waiting instruction and for which a MW call-back is to be made is determined on the basis of the information stored in the MW call-back candidate memory region 16*a*, and then the determined destination extension terminal is called. The destination change function is provided for changing the terminal to be called in reply to the message waiting request thereof by updating the information stored in the MW call-back candidate memory region 16*a* when the response to the calling made by the MW call-back processing function is not obtained. The destination change inhibition function is provided for inhibiting the updating of the information by the destination change function.

The key telephone system has the key service unit constituted as mentioned above. The operation of the key telephone system will be described below in order of processing steps of the CPU. The exchange service and the registration of the extension terminals which issued the message waiting instruction are executed in the same manner as that of the conventional key telephone system, and the description thereof is omitted. In this description, the processing relating to the MW call-back to the extension terminal set in the message waiting state will be mainly described.

In a waiting state, the CPU waits for a MW call-back request (ST 21 in FIG. 6).

When a predetermined instruction is issued according to the MW call-back request by the user at one of the extension terminals 2, the CPU 31 determines whether or not the MW call-back request is issued by inputting a predetermined destination fixing number (ST 22).

When the MW call-back request is issued not by the input of the destination fixing number, but by executing a normal operation (e.g. the pushing of a MW call-back key), the CPU 31 checks whether or not there is information in areas in the MW call-back candidate memory region 16*a*, which is provided to the extension terminal 2 issuing the MW call-back request (ST 25). In this time, the CPU 31 determines whether or not the information is registered in the first area of the MW call-back candidate memory region 16*a* (ST 24). When no information is registered in the first area, no message waiting instruction is issued to the requesting terminal, and thus the CPU 31 returns to ST 21 to be set in a wait state for waiting for the MW call-back request.

When the calling candidate information is registered in the first area, the CPU 31 controls the corresponding one of the extension line interface circuits 13 in order to call the extension terminal 2 indicated by the MW call-back candidate information stored in the first area (ST 25), and determines whether or not the response to the calling is obtained from the called terminal (ST 26).

If it is determined in ST 26 that the response is obtained, the CPU 31 updates the MW call-back candidate information (ST 27). The updating is executed to eliminate the information of the extension terminal 2 called in this time from the registration of the MW call-back candidate memory region 16*a* since the message waiting operation has been completed. When the information stored in the first area is deleted, the MW call-back candidate information stored in the second area is moved to the first area, the MW call-back candidate information stored in the third area is moved to the second area, and the MW call-back candidate information stored in the fourth area is moved to the third area. After moving them, the fourth area is represented by the character "FF".

When no response to the calling is obtained in ST 25, the CPU 31 determines whether or not the system is in the destination change inhibition mode (ST 28), and if the system is not in the destination change inhibition mode, the CPU 31 moves the MW call-back candidate information in each area of the MW call-back candidate memory region 16*a* (ST 29). More specifically, the MW call-back candidate information stored in the second area is moved to the first area, the MW call-back candidate information stored in the third area is moved to the second area, the MW call-back candidate information stored in the fourth area is moved to the third area, and the MW call-back candidate information stored in the first area is moved to the fourth area. Accordingly, when the extension terminal 2 connected to the port "00" issues the MW call-back request and the MW call-back candidate information is stored in the MW call-back candidate memory region 16*a* in such a manner as shown in FIG. 7A, the information is stored in such a manner as shown in FIG. 7B after the changing of the information.

When the MW call-back candidate information moving operation has been completed, the CPU 31 returns to ST 21, i.e., is set in a waiting state.

The requesting extension terminal 2 has an indicator (not shown) which indicates all the extension numbers of the MW call-back candidate terminals. The order of the indicated numbers are changed in accordance with the MW call-back candidate information moving operation. More specifically, when the port "01" is provided with an extension number "101", the port "02" is provided with an extension number "102", the port "03" is provided with an extension number "103", and the port "04" is provided with an extension number "104", and the MW call-back candidate memory region 16a stores the MW call-back candidate information in such a manner as shown in FIG. 7A, the extension numbers are indicated as shown in FIG. 8A. After moving the MW call-back candidate information, the indicator indicates the extension numbers in such a manner as shown in FIG. 8B.

As described above, according to the present embodiment, the MW call-back candidate indicated by the MW call-back candidate information stored in the first area of the MW call-back candidate memory region 16a is set to be called by the requesting terminal, and when no response to the calling in accordance with the MW call-back request is obtained from the terminal, the MW call-back candidate information in each area of the MW call-back candidate memory region 16a is moved to automatically change the terminal to be called next in reply to the MW call-back request by the same requiring terminal. In this manner, even if one of the MW call-back candidates cannot respond to the calling because the line is busy or the user is out, the user of the requesting extension terminal 2 for which the MW call-back candidates are registered can perform the MW call-back operation to the other MW call-back candidates merely by repeating the normal MW call-back request, with no special procedures.

Further, according to the above-mentioned method of the present invention, the extension terminal 2 which could not respond to the calling from the requesting terminal is never eliminated from the registration, and the user at the requesting terminal can thus perform the MW call-back operation to the terminal merely by repeating the normal MW call-back request.

In addition, the system of the present embodiment is provided with a destination fixing number, and when the MW call-back request is issued with a destination fixing number, the CPU 31 enters into the destination changing inhibition mode (ST 30). If the CPU 31 is in the destination changing inhibition mode when it is determined in ST 26 that the response to the calling performed in ST 25 has not been obtained, the CPU 31 returns to ST 21 without executing the increment of the count value in ST 29, i.e., the moving of the candidate information which is provided with a destination fixing number.

By setting the destination changing inhibition mode in this manner, the user can repeatedly perform the MW call-back operation to the specific MW call-back candidate also by the present embodiment, even if the specific terminal does not response to the MW call-back.

The Third Embodiment

The description of the third embodiment of the present invention will follow in conjunction with the drawings.

Figure 9:
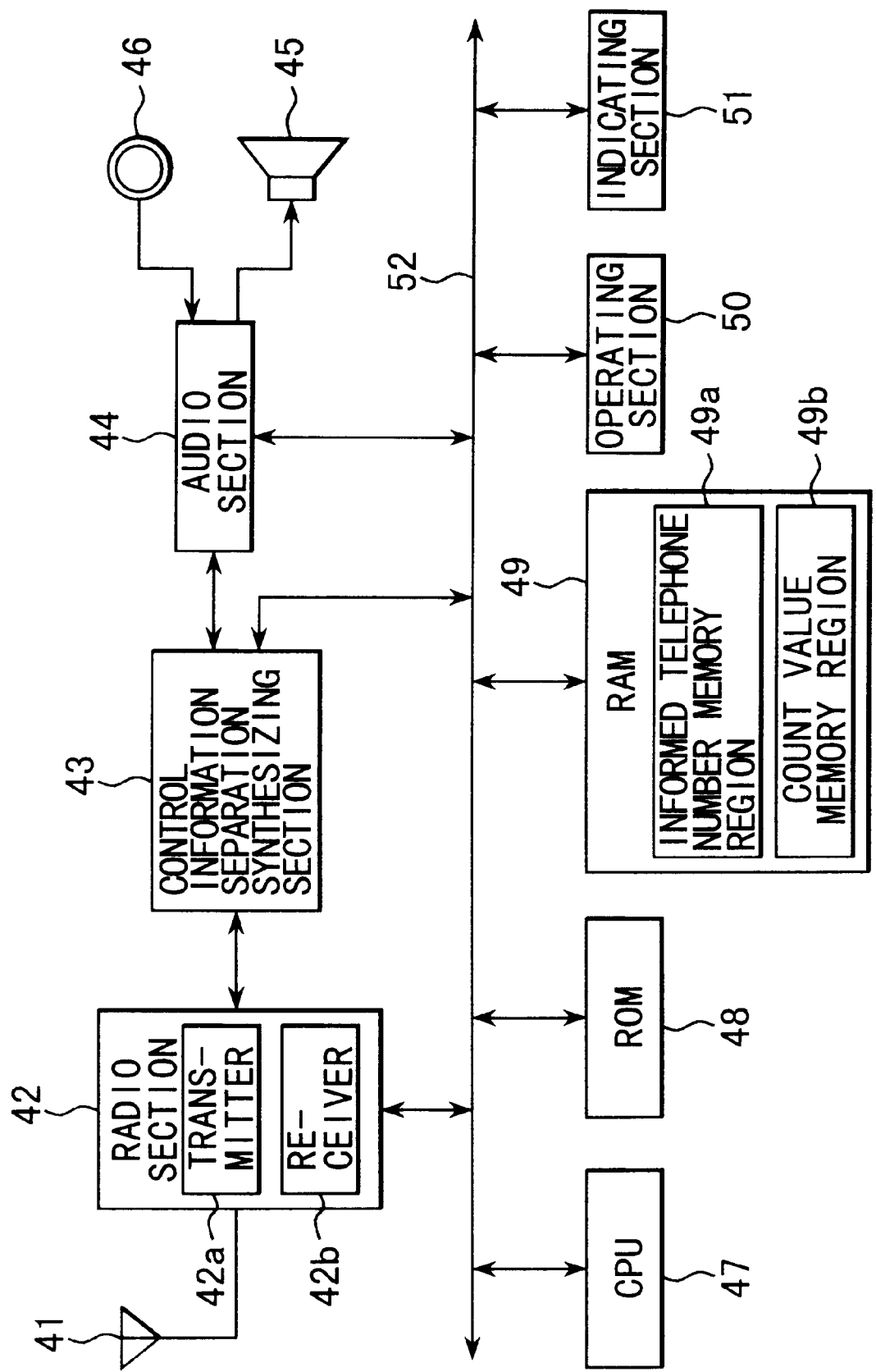
FIG. 9 is a block diagram showing the main portion of a cellular telephone having a structure including the communication terminal apparatus according to the third embodiment of the present invention.

FIG. 9 is a block diagram showing the main portion of a cellular telephone terminal apparatus having a structure including the communication terminal apparatus according to the present embodiment. As shown in the drawing, the cellular telephone terminal apparatus according to the present embodiment comprises antenna 41, radio section 42, control information separation synthesizing section 43, audio section 44, speaker 45, microphone 46, CPU 47, ROM 48, RAM 49, operating section 50, and indicating section 51.

The radio carrier wave signal transmitted from a base station is received by the antenna 41 and input to the receiver 42a of the radio section 42 of the terminal. The receiver 42a detects the signal of the desired channel in the received radio carrier wave signal and modulates it with use of the reception local oscillation signal generated by the frequency synthesizer provided to the radio section, to convert the desired channel signal into a received digital signal of the base band. The reception local oscillation frequency generated by the frequency synthesizer is specified for each of the desired channels by the CPU 47.

The received digital signal output from the receiver 42a is input into the control information separation synthesizing section 43. When a digital signal corresponding to the control information is exist in the received digital signal, the control information separation synthesizing section 43 extracts the digital signal.

The audio signal in the received digital signal is transmitted to the audio section 44 through the control information separation synthesizing section 43, and converted into an analog signal and amplified, then sent to the speaker 45. By processing the audio signal in this manner, the received audio signal is output from the communication terminal.

While, the audio signal input to the microphone 46 so as to be transmitted to the other terminal is converted into a digital signal and amplified in the audio section 5, and is transmitted to the radio section 42 through the control information separation synthesizing section 43. When the control information is output from the CPU 47 in this time, the control information is synthesized with the digital signal by the control information separation synthesizing section 43.

When the radio section 42 receives the digital signal of the base band to be transmitted to the other terminal, the digital signal is modulated by the transmitter 42b and the frequency thereof is also converted into a predetermined frequency band of the radio transmission channel with use of the transmission local oscillation signal generated by the frequency synthesizer. The processed transmission signal is amplified to a predetermined level enough to be transmitted as a radio carrier wave signal, and then output from the receiver 42b to be transmitted from the antenna 41.

The CPU 47 executes processings in accordance with the operating programs stored in the ROM 48 and controls each part of the cellular telephone terminal apparatus, thereby operates the cellular telephone terminal apparatus.

The RAM 49 stores various data necessary for the processing of the CPU. A part of memory regions of the RAM 49 is provided as informed telephone number memory region 49a and count value memory region 49b.

The informed telephone number memory region 49a is provided for storing the telephone number (hereinafter referred to as "informed telephone number") of the terminal of a calling user, which is informed from a network (not shown) when a called terminal does not respond thereto. The informed telephone number memory region 49a is divided into the first to fourth areas in each of which an informed telephone number can be stored. The count value memory region 49b stores count values indicating which of at most four telephone numbers stored in the informed telephone number memory region 49a is used for the caller ID callback.

The operating section 50 has function keys for a user's operations such as calling-up, caller ID call-back, inputting of a telephone number, and ringing-off, and numerical keys, by use of which the user inputs instructions.

The indicating section 51 is controlled by the CPU 47 to visually show various kinds of information to be informed to the user.

The CPU 47 executes processings in accordance with operating programs stored in the ROM 48, thereby attains not only the well-known general control function in the cellular telephone terminal apparatus, but also caller ID call-back processing function, count value updating function, and count value updating inhibition function, as described below.

According to the caller ID call-back processing function, when the user issues the caller ID call-back request by using the operating section 50, the CPU 47 determines the telephone number to be used for the caller ID call-back on the basis of the information stored in the informed telephone number memory region 49a and the count value memory region 49b, and executes the calling operation using the determined telephone number. The count value updating function is provided for incrementing each of the count values stored in the count value memory region 49b by one when the response to the calling made by the caller ID call-back processing function is not obtained. The count value updating inhibition function is provided for inhibiting the increment of the count values by the count value updating function.

The operation of the cellular telephone constituted as mentioned above will be described below in order of processing steps of the CPU 47. The processings such as the normal calling service and the storing of the informed telephone number are executed in the same manner as that of the conventional cellular telephone terminal apparatus, and the description thereof is omitted. In this description, the processing relating to the caller ID call-back to the terminal to be called back be mainly described.

Figure 11:
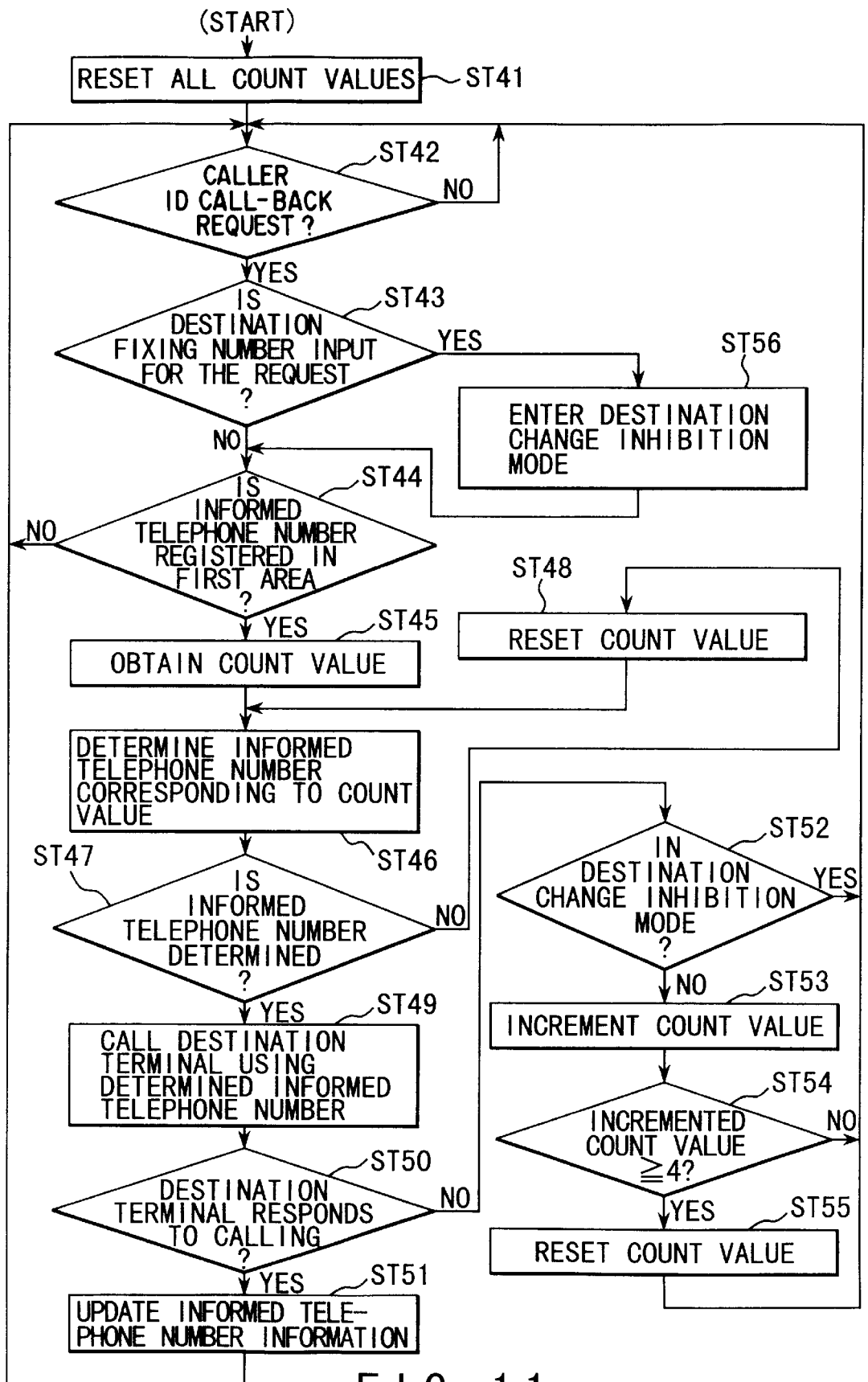
FIG. 11 is a flow chart representing the caller ID call-back processing by a CPU in reply to a caller ID call-back request.

The operation of the apparatus is started by turning the switch on or by resetting the system, and then the CPU 47 resets all the count values stored in the count value memory region 49b at "00" to initialize the count values (ST 41 in FIG. 11). After resetting the count values, the CPU waits for a caller ID call-back request, i.e., the instruction to send a caller ID call-back to a calling user which called to the terminal (ST 42).

After the user of the terminal inputs a predetermined instruction by using the operating section 50 to issue the caller ID call-back request, the CPU 47 determines whether or not the caller ID call-back request is issued by inputting a predetermined destination fixing number (ST 43).

When the caller ID call-back request is issued not by the input of the destination fixing number, but by executing a normal operation (e.g. the pushing of a caller ID call-back key), the CPU 47 determines whether or not the informed telephone number is registered in the first area of the informed telephone number memory region 49a (ST 44). When no informed telephone number is stored in the first area, no terminal to be called back is exist, and thus the CPU 47 returns to ST 42 to be set in a wait state for waiting for the caller ID call-back request.

When the informed telephone number is stored in the first area, the CPU 47 obtains from the count value memory region 49b (ST 45) the count value on the basis of which the telephone number to be used for the caller ID call-back is determined (ST 46). In ST 46, the area storing the telephone number to be used for the caller ID call-back is determined by use of the obtained count value. The telephone number stored in the determined area is to be used for the caller ID call-back. At the starting time for example, all the count values in the count value memory region 49b are reset at "00" indicating the first area. The informed telephone number is thus determined to be stored in the first area, and the informed telephone number stored in the first area is determined as the telephone number to be used for the caller ID call-back. In the case where the informed telephone numbers are stored in the informed telephone number memory region 49a in such a manner as shown in FIG. 10, the telephone number "01012345671" is determined the informed telephone number to be used for the caller ID call-back.

When the number of the informed telephone numbers stored in the informed telephone number memory region 49a are less than four, the number of areas storing the informed telephone number is smaller than four. Therefore, when the number of the count values is larger than that of the areas storing the informed telephone numbers and the area indicated by the largest code number stores no telephone number, the telephone number to be used for the caller ID call-back fails to be determined in ST 46. In consideration of the case where the determination fails, the CPU 47 checks whether or not the informed telephone number to be used for the caller ID call-back is determined in ST 46 (ST 47). When the informed telephone number to be used for the caller ID call-back is not determined in ST 46, the count value indicating the area storing the informed telephone number to be used for the caller ID call-back is reset to "00" in the count value memory region such that the count value indicates the first area (ST 48), and the CPU 47 returns to ST 46 to determine the informed telephone number to be used for the caller ID call-back.

When the informed telephone number to be used for the caller ID call-back is determined in ST 46, the CPU 47 executes the caller ID call-back using the determined telephone number (ST 49), and determines whether or not the response to the calling is obtained (ST 50).

If it is determined in ST 50 that the response is obtained, the CPU 47 updates the information stored in the informed telephone number memory region 49a (ST 51). The updating is executed to delete the informed telephone number used for the caller ID call-back in this time from informed telephone number memory region 49a. When the informed telephone number stored in the first area is used for the caller ID call-back operation, the informed telephone number stored in the second area is moved to the first area, the informed telephone number stored in the third area is moved to the second area, and the informed telephone number stored in the fourth area is moved to the third area. After moving them, the fourth area is represented by the character "FF" indicating that no telephone number is stored therein. In the other case where informed telephone number stored in the third area is used for the calling operation, the informed telephone number stored in the third area is deleted, the informed telephone number stored in the fourth area is moved to the third area without moving the informed telephone numbers stored in the first and second areas to anywhere. Then, the fourth area is represented by the character "FF" indicating that no telephone number is stored.

When no response to the calling is obtained in ST 49, the CPU 47 determines whether or not the system is in the destination change inhibition mode (ST 52), and if the system is not in the destination change inhibition mode, increments the count value used for the caller ID call-back by one (ST 53). The CPU 47 then determines whether or not the incremented count value is not less than "04" (ST 54). If the count value exceeds "03" indicating the fourth area, the CPU sets the count value at "00" (ST 55). By resetting the count value in this manner, the informed telephone number to be used for the next caller ID call-back is changed.

When the count value is determined in ST 54 not to be less than "04", or when the resetting of the count value has been completed in ST 55, the CPU 47 returns to ST 42, i.e., is set in a waiting state.

As described above, the informed telephone numbers to be used for the caller ID call-back to a plurality of informed telephone numbers stored in the informed telephone number memory region 49a is determined by the count value, and when no response to the calling in reply to the caller ID call-back request is obtained, the count value of the telephone number used for the caller ID call-back is incremented to automatically change the telephone number to be used for the caller ID call-back in reply to the next caller ID call-back request. In this manner, even if one of the informed telephone number the user of which cannot respond to the calling because the line is busy or the user is out, the user which made the caller ID call-back can perform the caller ID call-back operation by using the other informed telephone number merely by repeating the normal caller ID call-back request, with no special procedures.

In addition, according to the above-mentioned method of the present invention, the informed telephone number the user of which could not respond to the caller ID call-back is never deleted from the informed telephone number memory region 49a, and thus the user can perform the caller ID call-back operation using the informed telephone number so many times merely by repeating the normal caller ID call-back request.

In the mean time, according to the present embodiment, when a user does not respond to the caller ID call-back, the informed telephone number user for the caller ID call-back is automatically changed to the other telephone number to be used for the next caller ID call-back if a plurality of informed telephone numbers are stored in the informed telephone number memory region 49a. Therefore, even if the user wishes to perform the caller ID call-back operation using a specific informed telephone number, when the user of the specific informed telephone number does not response to the calling, the other informed telephone number will be automatically used in contrary to the user's intention.

In order to prevent such an undesired change of the destination telephone number, the system of the present embodiment is provided with a destination fixing number, i.e., a number indicating the specific caller ID call-back telephone number, and the CPU 47 enters into the destination changing inhibition mode when the caller ID call-back request is issued with a destination fixing number (ST 56). If the CPU 47 is in the destination changing inhibition mode when it is determined in ST 50 that the response to the caller ID call-back performed in ST 49 has not been obtained, the CPU 47 returns to ST 42 without executing the increment of the count value in ST 53.

By setting the destination changing inhibition mode in this manner, the user can repeatedly perform the caller ID call-back operation to the specific person, even if the specific person does not response to the caller ID call-back.

The Fourth Embodiment

The following is the description of the fourth embodiment of the present invention.

Figure 12:
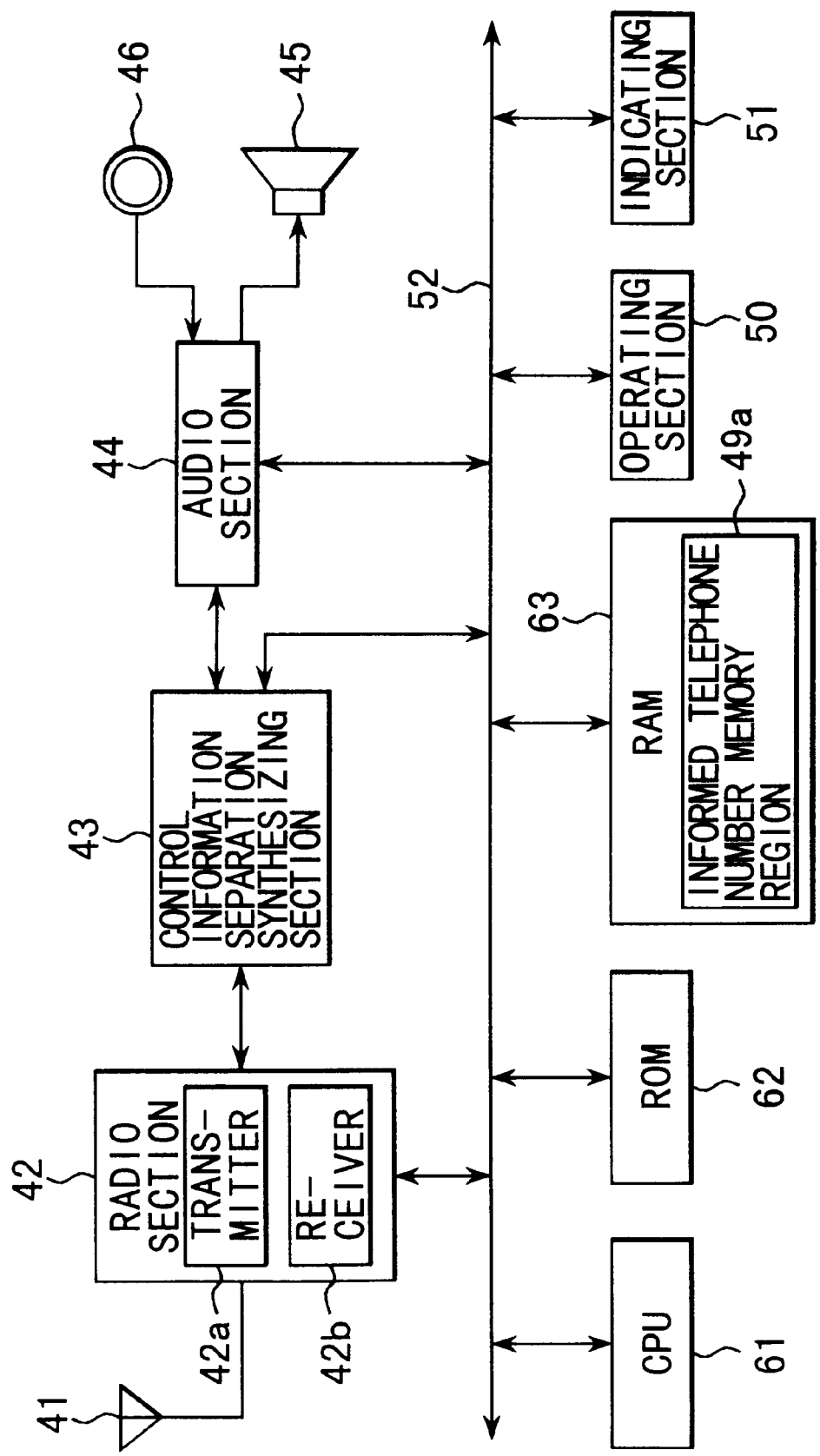
FIG. 12 is a block diagram showing the main portion of a cellular telephone having a structure including the communication terminal apparatus according to the four embodiment of the present invention.

FIG. 12 is a block diagram showing the main portion of a cellular telephone terminal apparatus having a structure including the communication terminal apparatus according to the present embodiment. The same portions as those shown in FIG. 9 are denoted as the same reference numerals for simplicity of illustration, and the detailed description is omitted.

As shown in the drawing, the cellular telephone terminal apparatus according to the present embodiment comprises antenna 41, radio section 42, control information separation synthesizing section 43, audio section 44, speaker 45, microphone 46, operating section 50, indicating section 51, CPU 61, ROM 62, and RAM 63.

As is clear from this constitution, the cellular telephone terminal apparatus in the present embodiment has the same structure as the cellular telephone terminal apparatus of the third embodiment except that the CPU 61, ROM 62, and RAM 63 are provided instead of the CPU 47, ROM 48, and RAM 48 of the third embodiment.

The CPU 61 executes processings in accordance with the operating programs stored in the ROM 62 and controls each part of the cellular telephone terminal apparatus, thereby operates the cellular telephone terminal apparatus.

The RAM 63 stores various data necessary for the processing of the CPU. A part of memory regions of the RAM 63 is provided as an informed telephone number memory region 49a.

The CPU 61 executes processings in accordance with operating programs stored in the ROM 62, thereby attains not only the well-known general control function in the cellular telephone terminal apparatus, but also caller ID call-back processing function, destination change function, and destination change inhibition function, as described below.

According to the destination change function, when the user issues the caller ID call-back request by using the operating section 50, the CPU 61 determines the telephone number to be used for the caller ID call-back on the basis of the information stored in the informed telephone number memory region 49a, and executes the calling operation using the determined telephone number. The destination change function is provided for changing the destination to be called next by updating the information stored in the informed telephone number memory region 49a when the response to the calling made by the caller ID call-back processing function is not obtained. The destination change inhibition function is provided for inhibiting the change of the destination by the destination change function.

The operation of the cellular telephone constituted as mentioned above will be described below in order of processing steps of the CPU. The processings such as the normal calling service and the storing of the informed telephone number are executed in the same manner as that of the conventional cellular telephone terminal apparatus, and the description thereof is omitted. In this description, the processing relating to the caller ID call-back to the terminal to be called back will be mainly described.

At the waiting state, the CPU 61 waits for a caller ID call-back request, i.e., the instruction to send a caller ID call-back to a calling user which called to the terminal (ST 61 in FIG. 13).

After the user of the terminal inputs a predetermined instruction by using the operating section 50 to issue the caller ID call-back request, the CPU 61 determines whether or not the caller ID call-back request is issued by inputting a predetermined destination fixing number (ST 62).

When the caller ID call-back request is issued not by the input of the destination fixing number, but by executing a normal operation (e.g. the pushing of a caller ID call-back key), the CPU 61 determines whether or not the informed telephone number is registered in the first area of the informed telephone number memory region 49a (ST 63). When no informed telephone number is stored in the first area, no terminal to be called back is exist, and thus the CPU 61 returns to ST 61 to be set in a wait state for waiting for the caller ID call-back request.

When the informed telephone number is stored in the first area, the CPU 61 executes the caller ID call-back using the telephone number stored in the first area (ST 64), and determines whether or not the response to the calling is obtained (ST 65).

If it is determined in ST 50 that the response is obtained, the CPU 61 updates the information stored in the informed telephone number memory region 49a (ST 66). The updating is executed to delete the informed telephone number used for the caller ID call-back in this time from informed telephone number memory region 49a. When the informed telephone number stored in the first area is used for the caller ID call-back operation, the informed telephone number stored in the second area is moved to the first area, the informed telephone number stored in the third area is moved to the second area, and the informed telephone number stored in the fourth area is moved to the third area. After moving them, the fourth area is represented by the character "FF" indicating that no telephone number is stored therein. In the other case where informed telephone number stored in the third area is used for the calling operation, the informed telephone number stored in the third area is deleted, the informed telephone number stored in the fourth area is moved to the third area without moving the informed telephone numbers stored in the first and second areas to anywhere. Then, the fourth area is represented by the character "FF" indicating that no telephone number is stored.

When no response to the calling is obtained in ST 64, the CPU 61 determines whether or not the system is in the destination change inhibition mode (ST 67), and if the system is not in the destination change inhibition mode, change the order of the telephone numbers stored in the informed telephone number memory region 49a (ST 68). More specifically, the informed telephone number stored in the second area is moved to the first area, the informed telephone number stored in the third area is moved to the second area, the informed telephone number stored in the fourth area is moved to the third area, and the informed telephone number stored in the first area is moved to the fourth area. FIG. 14B shows the change of the informed telephone numbers which has been stored in the informed telephone number memory region 49a in order as shown in FIG. 14A.

When the order change of the informed telephone numbers has been completed, the CPU 61 returns to ST 61, i.e., is set in a waiting state.

As described above, according to the present invention, the informed telephone numbers is stored in the first area of the informed telephone number memory region 49a in order to be used for the caller ID call-back to informed telephone numbers. When no response to the calling made in accordance with the caller ID call-back request is obtained, the order of the telephone numbers stored in the informed telephone number memory region 49a to automatically change the telephone number to be used for the caller ID call-back in reply to the next caller ID call-back request. In this manner, even if one of the informed telephone number the user of which cannot respond to the calling because the line is busy or the user is out, the user which made the caller ID call-back can perform the caller ID call-back operation by using the other informed telephone number merely by repeating the normal caller ID call-back request, with no special procedures.

In addition, according to the above-mentioned method of the present invention, the informed telephone number the user of which could not respond to the caller ID call-back is never deleted from the informed telephone number memory region 49a, and thus the user can perform the caller ID call-back operation using the informed telephone number so many times merely by repeating the normal caller ID call-back request.

In the mean time, according to the present embodiment, when a user does not respond to the caller ID call-back, the informed telephone number user for the caller ID call-back is automatically changed to the other telephone number to be used for the next caller ID call-back if a plurality of informed telephone numbers are stored in the informed telephone number memory region 49a. Therefore, even if the user wishes to perform the caller ID call-back operation using a specific informed telephone number, when the user of the specific informed telephone number does not response to the calling, the other informed telephone number will be automatically used in contrary to the user's intention.

In order to prevent such an undesired change of the destination telephone number, the system of the present embodiment is provided with a destination fixing number, i.e., a number indicating the specific caller ID call-back telephone number, and the CPU 61 enters into the destination changing inhibition mode when the caller ID call-back request is issued with a destination fixing number (ST 69). If the CPU 61 is in the destination changing inhibition mode when it is determined in ST 65 that the response to the caller ID call-back performed in ST 64 has not been obtained, the CPU 61 returns to ST 61 without executing the order change of the informed telephone number in ST 68.

By setting the destination changing inhibition mode in this manner, the user can repeatedly perform the caller ID call-back operation to the specific person, even if the specific person does not response to the caller ID call-back.

It is understood that the present invention is not limited to the embodiments described above. More specifically, when all the extension terminals controlled by the exchanging apparatus in the first and second embodiments do not need to be provided with the message-waiting service, the caller ID call-back candidate memory region or the count value memory region may be provided only to a part of the extension terminals. Further, the caller ID call-back candidate memory region or the count value memory region does not necessarily need to be provided fixedly to a specific extension terminal, and may be temporarily provided to terminals which receive a message waiting request every time when the message waiting request occurs.

In addition, the exchanging apparatus according to the present invention is described as a key telephone system in the first and second embodiments, but the may be applied as the other apparatus such as an office exchanger.

Further, it is limited to the extension terminals in the first and second embodiments to be provided with the message waiting service, but the message waiting service may be provided to the other (external) terminals connected through the other network such as a public network. When the message waiting service is provided to the external terminals, the memory regions which were provided to the external terminals registered in advance may be formed in the caller ID call-back candidate memory region, or similarly to the extension terminal as mentioned above, the terminals which receive a message waiting request may be temporarily provided with the memory regions every time when the external terminal receives a message waiting request.

In addition, the count means is realized by updating the count value stored in the count value memory region 16b or 49b by the CPU 14 or 47 in the first and third embodiments, but may be provided as a counter circuits for each of the extension terminals.

Further, the communication terminal apparatus according to the present invention is described as a cellular telephone terminal apparatus in the third and fourth embodiments, but may be applied as the other apparatus such as a wire telephone terminal device.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. An exchanging apparatus which calls a terminal designated by a calling terminal and connects the calling terminal and the called terminal when the called terminal responds to the calling from the calling terminal, comprising:

registering means for registering for each terminal the calling terminal as a call-back candidate terminal to be called by the called terminal when the called terminal does not respond to the calling from the calling terminal, the number of the calling terminals which can be registered for one called terminal being two or more;

call-back means for, each time a call-back request is made from an arbitrary one of terminals connected to the exchanging apparatus, calling only a predetermined one of the call-back candidate terminals which are registered for the requesting terminal; and change means for, when the predetermined one of the call-back candidate terminals receiving the call-back does not respond thereto, changing information of the predetermined one of the call-back candidate terminals by replacing it with that of another one of the call-back candidate terminals to be called in response to a next call-back request when another one of the call-back candidate terminals is registered in the registering means.

2. An exchanging apparatus according to claim 1, further comprising change inhibiting means for inhibiting in reply to a predetermined instruction the change means from changing information of the predetermined one of the call-back candidate terminals by replacing it with that of the other one of the call back candidate terminals to be called in response to the next call-back request.

3. An exchanging apparatus which calls a terminal designated by a calling terminal and connects the calling terminal and the called terminal when the called terminal responds to the calling from the calling terminal, comprising:

registering means for registering for each terminal a predetermined number of calling terminals as a call-back candidate terminal to be called by a called terminal when the called terminal does not respond to the calling from the calling terminal, the number of the calling terminals which can be registered for one called terminal is two or more;

count means provided to each of terminals which can be the called terminal, capable of cyclically counting the predetermined number;

call-back means for, in response to a call-back request from an arbitrary one of terminals connected to the exchanging apparatus, calling a predetermined one of the call-back candidate terminals, which corresponds to a count value of one of the count means provided to the requesting terminal; and count control means for, when the one of the call-back candidate terminals receiving the call-back does not respond thereto, changing the count value of the one of the counting means which is provided to the requesting terminal.

4. An exchanging apparatus according to claim 3, further comprising count control inhibiting means for inhibiting in reply to a predetermined instruction the count means from changing the count value of the one of the counting means which is provided to the requesting terminal.

5. An exchanging apparatus which calls a terminal designated by a calling terminal and connects the calling terminal and the called terminal when the called terminal responds to the calling from the calling terminal, comprising:

storing means for storing identification information of calling terminals so as to correspond to the destination terminal respectively when the destination terminal does not respond to the calling from the calling terminal, each of the calling terminal being provided with a plurality of memory regions a priority of each of the memory regions being determined in advance;

call-back means for calling the terminal corresponding to the identification information stored in one of the memory regions which has the highest priority, as a massage-waiting call-back destination terminal to be called in response to a call-back request from an arbitrary one of the terminals connected to the exchanging apparatus; and priority update means for, when a response to the call-back is not obtained, moving the identification information stored in the memory region having the highest priority to a memory region having the lowest priority, and moving other identification information each stored in other memory regions to the memory regions each having a priority one higher than that of the memory regions in which each of the identification information is stored at first.

6. An exchanging apparatus according to claim 5, further comprising priority update inhibiting means for inhibiting in reply to a predetermined instruction the priority update means from moving the identification information each stored in the memory regions to the other memory regions.

7. A communication terminal apparatus which performs communication through a communication network which has a function of sending to a called terminal calling information for calling a calling terminal back when the calling terminal calls the called terminal, comprising:

storing means for storing a plurality of the calling information sent from the communication network;

call-back means for, each time a predetermined call-back request is made, calling the calling terminal with use of only a predetermined one of the calling information stored in the storing means; and change means for, when the calling by the call-back means does not obtain a response, changing the calling information by replacing it with different calling information to be used in response to a next call-back request when other calling information is stored in the storing means.

8. A communication terminal apparatus according to claim 7, further comprising change inhibiting means for inhibiting in reply to a predetermined instruction the change means from changing information by replacing it the other information to be used in response to the next call-back request.

9. A communication terminal apparatus which performs communication through a communication network which has a function of sending to a called terminal calling information for calling a calling terminal back when the calling terminal calls the called terminal, comprising:

storing means for storing a predetermined number of the calling information sent from the communication network when a terminal is called;

count means capable of cyclically counting the number of the calling information;

call-back means for, in response to a predetermined call-back request, calling the calling terminal with use of one of the calling information stored in the storing means, which corresponds to a count value of the counting means; and count control means for, when the calling by the call back means does not obtained response, changing the count value of the counting means.

10. A communication terminal apparatus according to claim 9, further comprising count control inhibiting means for inhibiting in reply to a predetermined instruction the count means from changing the count value of the one of the counting means which is provided to the requesting terminal.

11. A communication terminal apparatus which performs communication through a communication network which has a function of sending to a called terminal calling information for calling a calling terminal back when the calling terminal calls the called terminal, comprising:

storing means for storing the calling information sent from the communication network when a terminal is called, the storing means having a plurality of memory regions, a priority order of each of the memory regions being determined in advance;

call-back means for, in response to a predetermined call-back request, calling the calling terminal with use of the identification information stored in a memory region with the highest priority; and priority update means for, when the calling by the call-back means does not obtained a response, moving the identification information stored in the memory region with the highest priority to a memory region having the lowest priority, and moving the other identification information stored in the other memory regions to the memory regions each having a priority one higher than that of the memory regions in which each of the identification information is stored at first.

12. A communication terminal apparatus according to claim 11, further comprising priority update inhibiting means for inhibiting in reply to a predetermined instruction the priority update means from moving the identification information each stored in the memory regions to the other memory regions.

13. An exchanging method of calling a terminal designated by a calling terminal and connecting the calling terminal and the called terminal when the called terminal responds to the calling from the calling terminal, comprising:

a registering step of registering for each terminal a calling terminal as a call-back candidate terminal to be called by a called terminal in registering means for registering the terminal when the called terminal does not respond to the calling from the calling terminal, the number of the calling terminals which the registering means can register for one called terminal being two or more;

a call-back step of, each time a call-back request is made from an arbitrary one of terminals connected to the exchanging apparatus, calling only a predetermined one of the call-back candidate terminals which are registered for the requesting terminal; and a change step for, when the predetermined one of the call-back candidate terminals receiving the call-back does not respond thereto, changing information of the predetermined one of the call-back candidate terminals by replacing it with that of another one of the call-back candidate terminals to be called in response to a next call-back request when another one of the call-back candidate terminals is registered in the registering means.

14. An exchanging method of calling a terminal designated by a calling terminal and connecting the calling terminal and the called terminal when the called terminal responds to the calling from the calling terminal, comprising:

a registering step of registering for each terminal a calling terminal as a call-back candidate terminal to be called by a called terminal in registering means for registering the terminal when the called terminal does not respond to the calling from the calling terminal, the number of the calling terminals which the registering means can register for one called terminal being two or more;

a call-back step of, in response to a call-back request from an arbitrary one of terminals connected to the exchanging apparatus, calling a predetermined one of the call-back candidate terminals, which corresponds to a count value of one of the count means provided to the requesting terminal, capable of cyclically counting the predetermined number; and a count control step of, when the one of the call-back candidate terminals receiving the call-back does not respond thereto, changing the count value of the one of the counting means which is provided to the requesting terminal.

15. An exchanging method of calling a terminal designated by a calling terminal and connecting the calling terminal and the called terminal when the called terminal responds to the calling from the calling terminal, comprising:

a storing step of storing identification information of calling terminals in storing means, in which each of the calling terminal is provided with a plurality of memory regions a priority of each of the memory regions being determined in advance, so as to correspond to the destination terminals respectively when the destination terminal does not respond to the calling from the calling terminal;

a call-back step of calling the terminal corresponding to the identification information stored in one of the memory regions which has the highest priority, as a call-back destination terminal to be called in response to a call-back request from an arbitrary one of terminals connected to the exchanging apparatus; and a priority update step of, when a response to the call-back is not obtained, moving the identification information stored in the memory region having the highest priority to a memory region having the lowest priority, and moving other identification information each stored in other memory regions to the memory regions each having a priority one higher than that of the memory regions in which each of the identification information is stored at first.

16. A communication terminal apparatus control method for performing communication through a communication network which has a function of sending to a called terminal calling information for calling a calling terminal back when the calling terminal calls the called terminal, comprising:

a step of storing in storing means a plurality of the calling information sent from a communication network;

a call-back step of, in response to a predetermined call-back request, calling the calling terminal with use of a predetermined one of the calling information stored in the storing step; and a update step of, when the calling by the call-back means does not obtain a response, updating the calling information by replacing it with different calling information to be used in response to a next call-back request when other calling information is stored in the storing step.

17. A communication terminal apparatus control method of performing communication through a communication network which has a function of sending to a called terminal calling information for calling a calling terminal back when the calling terminal calls the called terminal, comprising:

a storing step of storing in storing means for storing a predetermined number of the calling information sent from the communication network when a terminal is called;

a call-back step of, in response to a predetermined call-back request, calling the calling terminal with use of one of the calling information stored in the storing means, which corresponds to a count value of count means capable of cyclically counting the number of the calling information; and a count control step of, when the calling by the call back means does not obtained response, changing the count value of the counting means.

18. A communication terminal apparatus control method for performing communication through a network having a function of sending to a called terminal calling information for calling a calling terminal back when the calling terminal calls the called terminal, comprising:

a storing step of storing in storing means for storing the calling information sent from the communication network when a terminal is called, the storing means having a plurality of memory regions, a priority order of each of the memory regions being determined in advance;

a call-back step, in response to a predetermined call-back request, calling the calling terminal with use of the identification information stored in a memory region with the highest priority; and a priority update step of, when the calling by the call-back means does not obtained a response, moving the identification information stored in the memory region with the highest priority to a memory region having the lowest priority, and moving other identification information stored in other memory regions to the memory regions each having a priority one higher than that of the memory regions in which each of the identification information is stored at first.

19. An exchanging apparatus which calls a terminal designated by a calling terminal and connects the calling terminal and the called terminal when the called terminal responds to the calling from the calling terminal, comprising:

registering means for registering for each terminal the calling terminal as a call-back candidate terminal to be called by the called terminal when the called terminal does not respond to the calling from the calling terminal, the number of the calling terminals which can be registered for one called terminal being two or more;

call-back means for, each time a call-back request is made from an arbitrary one of terminals connected to the exchanging apparatus, calling only a predetermined one of the call-back candidate terminals which are registered for the requesting terminal, and when a plurality of call-back destinations are registered in the registering means, for calling a call-back candidate terminal different from that called in response to a previous call-back request from a same requesting terminal.

20. An exchanging apparatus according to claim 19, further comprising a change inhibiting means responsive to a predetermined instruction, for controlling the call-back means to call the same call-back candidate terminal which is called in response to the previous call-back request from the same requesting terminal.

21. A communication terminal apparatus which performs communication through a communication network which has a function of sending to a called terminal calling information for calling a calling terminal back when the calling terminal calls the called terminal, comprising:

storing means for storing plurality of the calling information sent from the communication network;

call-back means for calling the calling terminal with use of only one predetermined piece of the calling information each time a predetermined call-back request is made, and when another piece of calling information is stored in the storing means, for calling said another calling terminal with use of another calling information different from that used for the previous call-back request.

22. A communication terminal apparatus according to claim 21, further comprising change inhibiting means responsive to a predetermined instruction, for controlling the call-back means to place a callback with use of calling information the same as that used in response to the previous call-back request.

23. An exchanging method of calling a terminal designated by a calling terminal and connecting the calling terminal and the called terminal when the called terminal responds to the calling from the calling terminal, comprising:

a registering step of registering for each terminal a calling terminal as a call-back candidate terminal to be called by a called terminal in registering means for registering the terminal when the called terminal does not respond to the calling from the calling terminal, the number of the calling terminals which the registering means can register for one called terminal being two or more;

a call-back step of calling only a predetermined one of the call-back candidate terminals which are registered for the requesting terminal each time a call-back request from an arbitrary one of terminals is made, and when a plurality of call-back destinations are registered in the registering means, for calling a call-back candidate terminal different from that called in response to a previous call-back request from a same requesting terminal.

24. A communication terminal apparatus control method for performing communication through a communication network which has a function of sending to a called terminal calling information for calling a calling terminal back when the calling terminal calls the called terminal, comprising:

a step of storing in storing means a plurality of the calling information sent form a communication network;

a call-back step of calling the calling terminal with use of only one predetermined piece of the calling information stored in the storing step each time a predetermined call-back request is made, and when another piece of call-back information is stored in the storing means, for calling another calling terminal with use of another piece of calling information different from that used in response to a previous call-back request.

* * * * *

UNITED STATES PATENT AND TRADEMARK OFFICE
CERTIFICATE OF CORRECTION

PATENT NO.    : 6,118,863
DATED         : September 12, 2000
INVENTOR(S)   : Isaku Komuro et al.

It is certified that error appears in the above-identified patent and that said Letters Patent is hereby corrected as shown below:

Column 22,
Line 31, delete "massage-waiting".

Signed and Sealed this

Twenty-first Day of September, 2004

JON W. DUDAS
*Director of the United States Patent and Trademark Office*